United States Patent [19]

Yoshimi et al.

[11] Patent Number: 4,743,883
[45] Date of Patent: May 10, 1988

[54] STEERING ANGLE INDICATING SYSTEM FOR A VEHICLE

[75] Inventors: Tomohisa Yoshimi, Gamagori; Yuji Takeo, Toyokawa; Yoshio Shinoda, Aichi, all of Japan

[73] Assignee: Nippondenso Co., Ltd., Kariya, Japan

[21] Appl. No.: 737,086

[22] Filed: May 23, 1985

[30] Foreign Application Priority Data

May 28, 1984 [JP] Japan ................... 59-108190

[51] Int. Cl.⁴ .............................................. B60Q 1/00
[52] U.S. Cl. .................. 340/52 R; 340/52 D; 340/672; 340/56; 200/61.54
[58] Field of Search ............. 340/52 R, 56, 74, 576, 340/52 D, 672; 200/61.54; 307/10 LS

[56] References Cited

U.S. PATENT DOCUMENTS

| | | | |
|---|---|---|---|
| 3,559,205 | 1/1971 | Colby | 340/52 R X |
| 3,673,561 | 6/1972 | Bronstein | 340/52 R |
| 4,007,357 | 2/1977 | Yanagishima | 340/52 R X |
| 4,219,800 | 8/1980 | Le Viness | 340/576 X |
| 4,264,891 | 4/1981 | Bergmann et al. | 340/55 X |
| 4,438,425 | 3/1984 | Tsuchida et al. | 340/55 |
| 4,581,607 | 2/1984 | Seko et al. | 340/576 |

Primary Examiner—Joseph A. Orsino
Assistant Examiner—Jeffery A. Hofsass
Attorney, Agent, or Firm—Cushman, Darby & Cushman

[57] ABSTRACT

A steering angle indicating system for a vehicle includes a plurality of rotational angle sensors arranged within a steering wheel of the vehicle, each thereof producing an electric signal indicative of a turn angle of the steering wheel, an indicating unit responsive to the turn angle signals from the rotational angle sensors to compute the turn direction and the turn angle of the steering wheel and to indicate a result of the computation, and a power supply circuit supplied with electric power from a load side of a horn switch prearranged within the steering wheel. The system prevents the occurrence of a collision caused by careless starting of the vehicle by the driver.

12 Claims, 6 Drawing Sheets

STEERING ANGLE INDICATING SYSTEM FOR A VEHICLE

BACKGROUND OF THE INVENTION

1. Field of the Invention

The present invention relates to a steering angle indicating system for a vehicle which prevents which can be a collision from occurring caused by the driver of the vehicle carelessly starting the vehicle. More specific, the present invention relates to a steering angle indicating system for a vehicle, which warns the driver of the vehicle who is about to start the vehicle carelessly from a parking place or the like under the impression that the vehicle will not move straight ahead, because the front tires of the vehicle have been turned sidewards. This condition can cause the vehicle to collide against an obstacle such as a near vehicle or wall, if the driver should start the vehicle in its present state.

2. Description of the Prior Art

Various systems for the above purpose have been devised in the past. Most of these systems have been so designed that the turn angle of a steering wheel is detected on the vehicle body side, namely, on the stationary side of the steering wheel.

However, when using a commercially available system of this kind, which naturally necessitates the mounting of the system on a vehicle after the vehicle has been put on the market, it is inevitable that the system is divided into a detecting section and an indicating section in order to effect the detection on the vehicle side. Particularly, the detecting section is generally mounted on such a portion as a lower arm or a steering column which is not conveniently available and therefore the mounting of the detecting section is generally difficult.

SUMMARY OF THE INVENTION

The present invention has been made with a view to overcoming the foregoing deficiency in the prior art. It is therefore an object of the present invention to provide a steering angle indicating system for a vehicle which can be easily mounted on a vehicle after the vehicle has been put on the market and which is so designed that a warning indicating section thereof can be mounted on the upper surface of a steering wheel portion which can be readily perceived from the driver's seat.

In accordance with this invention there is provided a steering angle indicating system for a vehicle including a plurality of rotational angle sensors each thereof being arranged within a steering wheel to generate a signal corresponding to a turn angle of the steering wheel, an indicating section responsive to angle signals from the rotational angle sensors to compute the turn direction and the turn angle of the steering wheel and to indicate a result of the computation, and a power supply circuit having a battery protective function constructed to be supplied with electric power from the load side of a horn switch disposed in the steering wheel so that the indicator lamps of the indicating section are selectively turned on only in case of need so as to prevent waste of electric charge stored in the battery.

DESCRIPTION OF THE PREFERRED EMBODIMENTS

The present invention will now be described in greater detail with reference to the illustrated embodiment.

Figure 1:
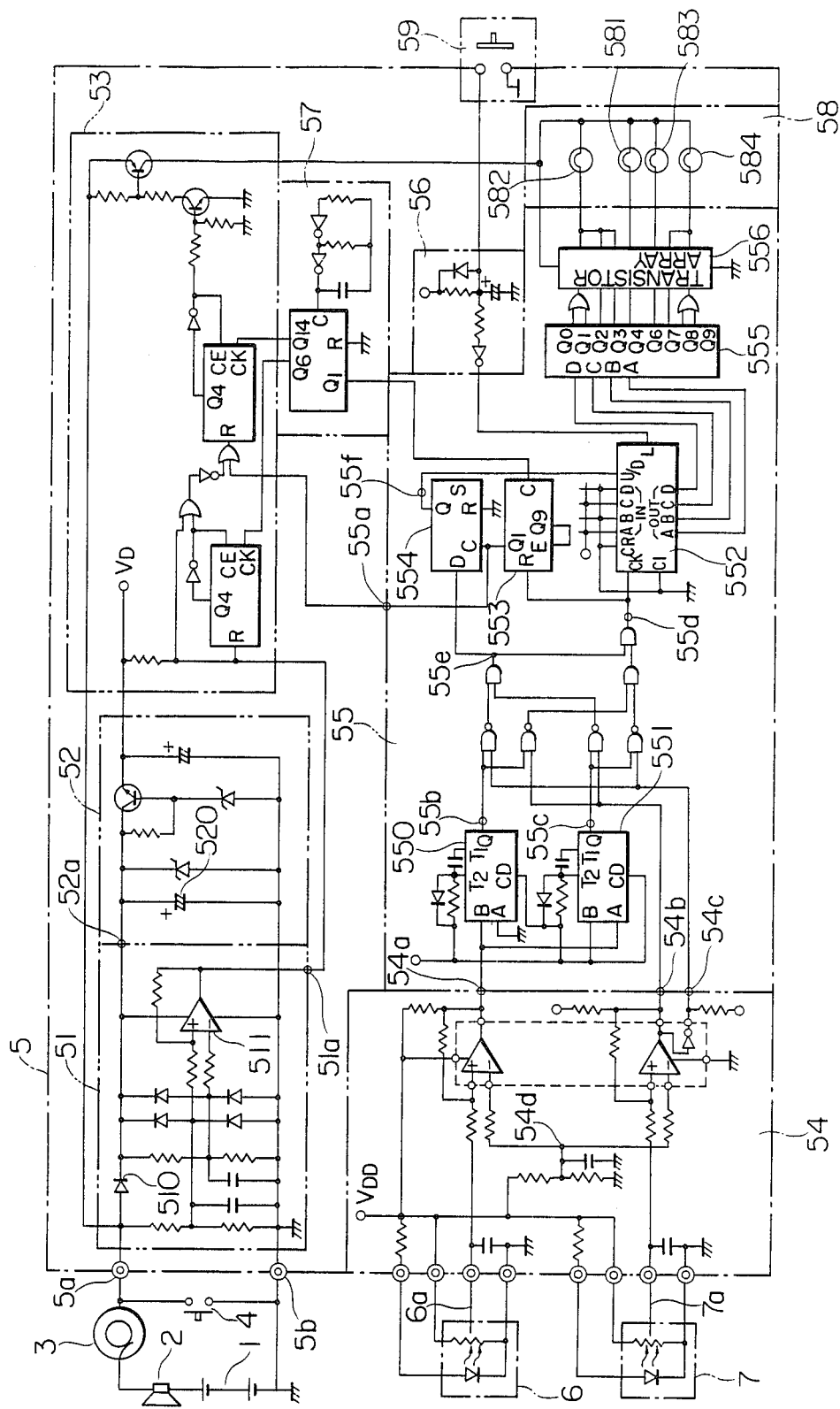
FIG. 1 is an electric circuit diagram showing the general construction of the steering angle indicating system for a vehicle according to this invention.

FIG. 1 in the accompanying drawings is an electric circuit diagram showing the general or overall construction of the system according to this invention. In FIG. 1, numeral 1 designates a vehicle-mounted battery. Numeral 2 designates a horn which sounds in response to switching-on of a horn switch 4. Numeral 3 designates a slip ring for supplying electric power from the vehicle body side to the steering wheel of the vehicle, which is a turning member. A plurality of horn switches 4 are mounted on the steering wheel. Numerals 6 and 7 designate rotational angle sensors for detecting the turn angle of the steering wheel, whose construction and function will be described later with reference to FIGS. 2A and 2B.

Numeral 5 designates the whole structure of an indicating section of the system of this invention, inclusive of a power supply circuit. In the indicating section 5, numeral 51 designates a voltage drop detecting circuit for detecting a voltage drop occurring at a horn switch load-side terminal 5a, with a potential difference between the terminals 5a and 52a being always monitored by a voltage comparator 511. For example, when an ignition switch (not shown) is closed and the starter is operated, the vehicle-mounted mounted battery 1 supplies a great amount of load power to the starter, thereby causing a sudden voltage drop. Thus, the voltage at the terminal 5a decreases suddenly.

On the other hand, the terminal 52a is connected to the ungrounded terminal of a charging capacitor 520 which forms, along with a diode 510, a charging circuit. Therefore the voltage at the terminal 52a decreases at a slower rate than the terminal 5a. Thus, when the starter is operated, the relation between the voltage values $V_{5a}$ and $V_{52a}$ at the terminals 5a and 52a, respectively, become $V_{5a} < V_{52a}$, so that a low-level signal is generated from an output terminal 51a of the voltage comparator 511 as a starter signal. It is to be noted that usually a high-level signal is generated from the terminal 51a. The output signal from the output terminal 51a of the voltage comparator 511 will hereinafter be referred to as a starter signal. Numeral 52 designates a known type of voltage regulator circuit including a resistor and Zener diodes.

Numeral 53 designates an indicating power supply circuit for controlling the supply of electric power to an indicating lamp section 58. This power supply circuit receives the starter signal from the terminal 51a and an angle indicative signal from an output terminal 55a of a turn discriminating circuit 55, which includes a rotational angle computing circuit for computing a turn angle of the steering wheel, the power supply circuit 53 perform a logical operation on these signals, and supplies electric power to the lamp section 58 for a given period of time. The indicating power supply circuit 53 includes a timer circuit employing known CMOS ICs such as TC4520 and TC4071. In order to prevent a misoperation from being caused by a one-shot style noise signal which may be contained in the starter signal (e.g., a drop in the battery voltage due to a momentary rush current caused by the lighting of the heat lamps of the vehicle), only when the starter signal remains at the low level for a predetermined time period, does the indicating power supply circuit 53 decide that the starter signal was caused by the power supply to the starter and controls the power supply to the lamp section 58 accordingly.

Numeral 54 designates a sensor signal processing circuit for comparing an analog voltage produced by each of the rotational angle sensors 6 and 7 with a reference voltage by the use of a voltage comparator, to generate a digital rotational angle signal.

Figure 4:
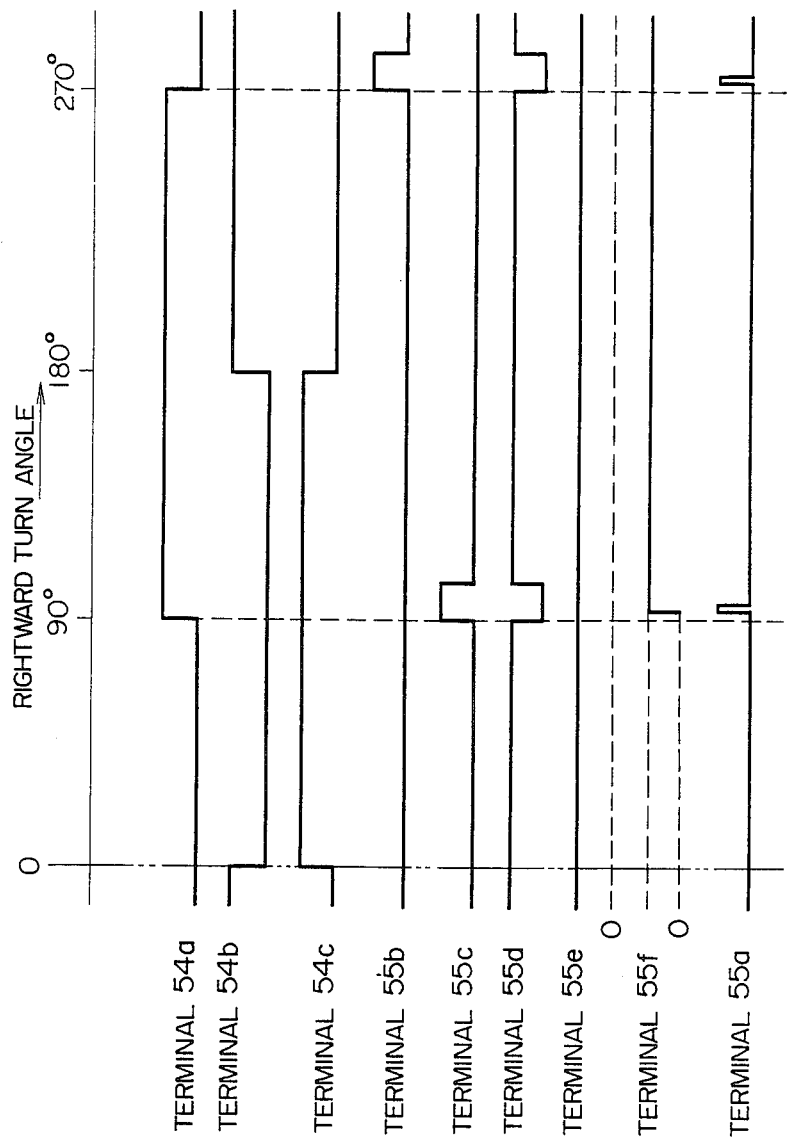
FIG. 4 is a signal waveform diagram showing the waveforms of signals generated at various portions of the turn discriminating circuit 55 shown in FIG. 1 in response to the rightward turn of the steering wheel.
Figure 5:
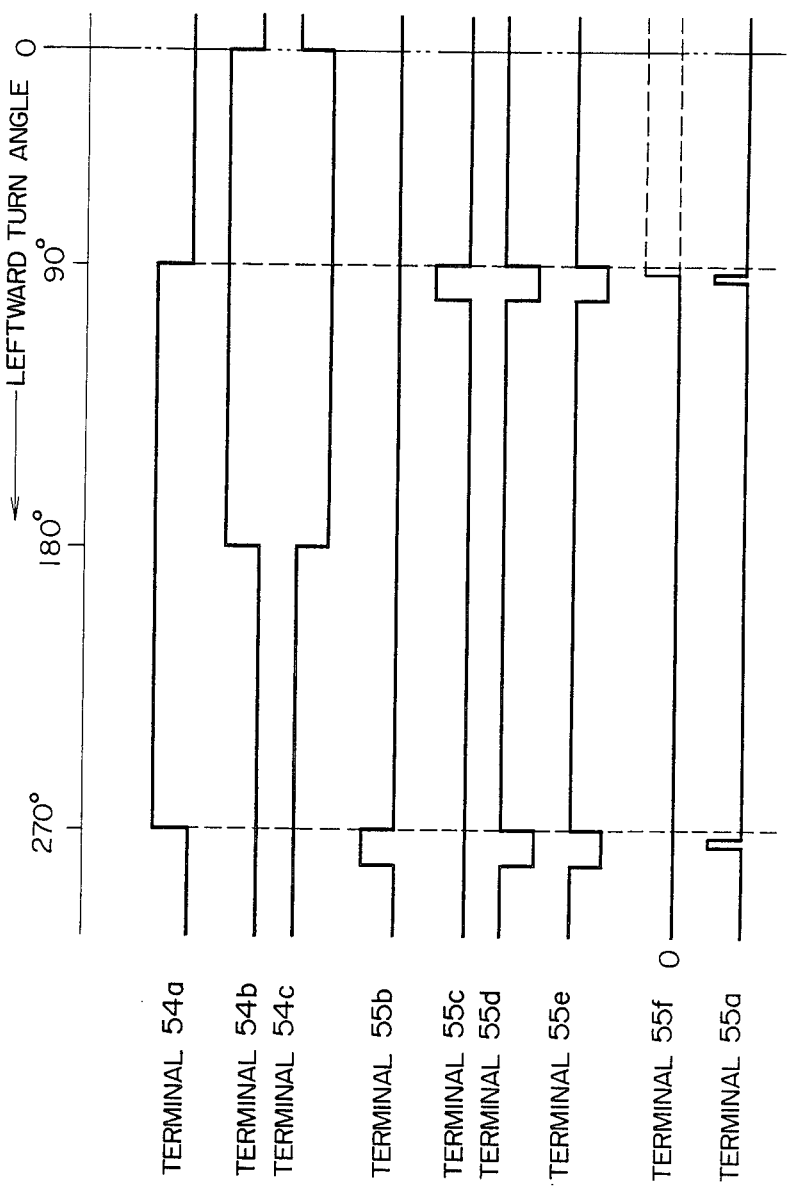
FIG. 5 is a signal waveform diagram showing the waveforms of signals generated at various portions of the turn discriminating circuit 55 shown in FIG. 1 in response to the leftward turn of the steering wheel.

The turn discriminating circuit 55 is responsive to the rotational angle signal generated from the sensor signal processing circuit 54 to compute the turn direction and the turn angle of the steering wheel, and its detailed operation will be described later with reference to the signal waveforms shown in FIGS. 4 and 5 generated during the operation of this system.

Numeral 56 designates a power-on pulse generating circuit including resistors, a capacitor, a diode and an inverter, and this circuit operates to effect initial setting of the turn discriminating circuit 55.

Numeral 57 designates a known type of CR oscillation circuit including resistors, a capacitor, inverters, etc., which generates and supplies clock signals to desired parts of this system.

Numeral 58 designates an indicating lamp section which is responsive to an angle indicative signal generated from the turn discriminating circuit 55 to give a turn angle warning indication. In this embodiment, the indicating lamp section 58 is constructed so that it turns on a lamp 583 in the range of the rightward turn angle of the steering wheel from 90° to 270° from its center position, a lamp 584 in the range of the rightward turn angle from 270° to 810° from the center position, a lamp 581 in the range of the leftward turn angle from 90° to 270° from the center position, a lamp 582 in the range of the leftward turn angle from 270° to 360° from the center position, and no lamp is turned on in the range of the leftward and rightward turn angle less than 90° from the center position. The lamps 581 and 583 emit a yellow light beam and the lamps 582 and 584 emit a red light beam thereby to alert the driver's attention.

Figure 6:
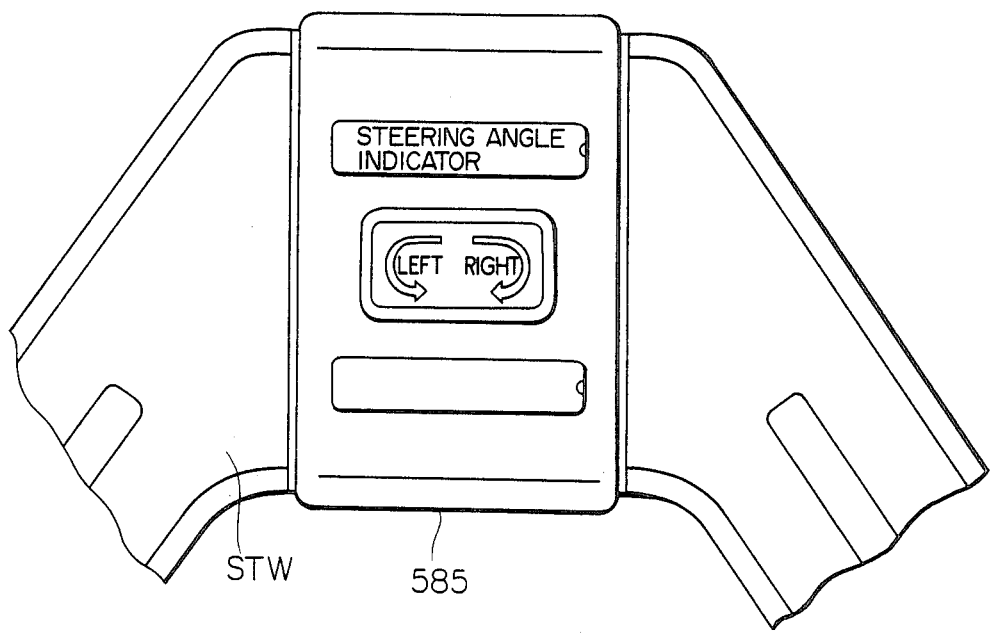
FIG. 6 is a plan view showing an indicating panel of the indicating lamp section of the steering angle indicating system of this invention which has been mounted on the steering wheel.

FIG. 6 is a plan view showing an indicating panel 585 of the indicating lamp section 58. As shown in FIG. 6, the indicating panel 585 is arranged on the central portion of the steering wheel STW. The yellow lamp 581 and the red lamp 582 are arranged on the rear side of the arrow portion at the left of the central portion and the yellow lamp 583 and the red lamp 584 are arranged on the rear side of the arrow portion at the right of the central portion, thereby giving a warning indication of the degree of the leftward or rightward turn, respectively.

Numeral 59 designates a setting switch for effecting an initial setting at the time of mounting of the system of this invention on the vehicle, to initially set the values of indication angles indicated by angle indicative signals produced by the turn discriminating circuit 55.

Figure 2A:
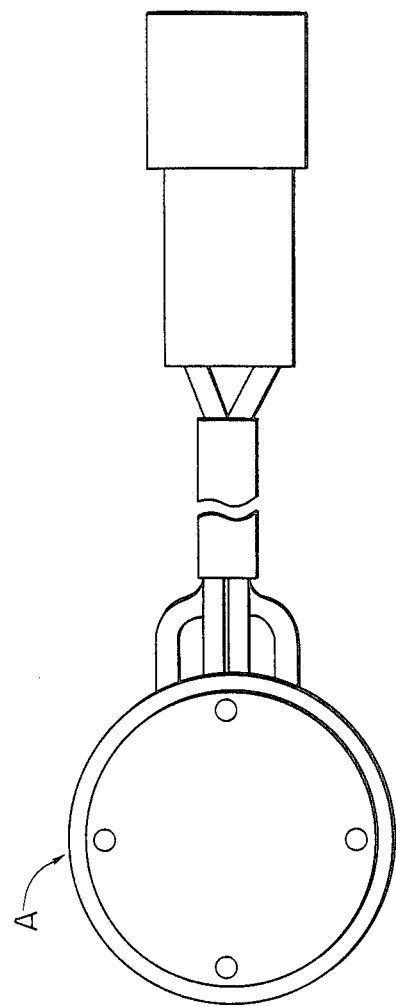
FIGS. 2A and 2B are respectively a front view and a side sectional view showing the construction of the rotational angle sensors of the system of this invention.
Figure 2B:
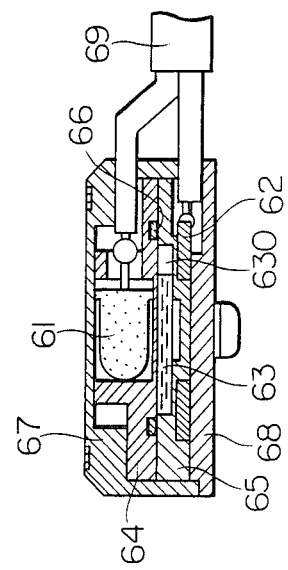

FIGS. 2A and 2B are respectively a plan view and a side sectional view showing the construction of the rotational angle sensors 6 and 7 in the system of this invention. In FIG. 2B, numeral 61 designates a red light-emitting diode which is, for example, the known EBR 5504S manufactured by Stanley Electric Co., Ltd. in this embodiment, and which is always turned on. Numeral 62 designates a ring-shaped photoelectric displacement sensing element which is, for example, the MPC-1054 manufactured by Moririca Co., Ltd. Numeral 63 designates a shielding liquid for blocking the passage of the light beam from the red LED 61, and a bubble portion 630 is arranged in the shielding liquid 63 to permit the light beam from the red LED 61 to be transmitted therethrough to the photoelectric displacement sensing element 62. Numeral 64 designates a photo lens for holding the red LED 61 in place, and in this embodiment a transparent acrylic resin lens is used as the photo lens.

Numeral 65 designates a register lens for positioning the photoelectric displacement sensing element 62, and in this embodiment a transparent acrylic resin lens is used as the register lens. The register lens 65, the photo lens 64 and an O-ring 66 hermetically seal and hold the shielding liquid 63 in place. Numeral 67 designates a housing which contains, in cooperation with a bottom plate 68, the previously mentioned component elements and which also prevents a disturbance light beam from entering the rotational angle sensors 6 and 7. Numeral 69 designates a wiring harness for supplying an applied voltage to the red LED 61 and for taking out an output signal from the photoelectric displacement sensing element 62.

In using the rotational angle sensors 6 and 7 of the above-described construction, if, for example, the rotational angle sensors 6 and 7 are mounted on the steering wheel of the vehicle as shown in the front view of FIG. 2A so that the gravitational force acts circumferentially on the shielding liquid 63, the bubble 630 in the shielding liquid 63 is always located at and near a point "A" at an upper part of the rotational angle sensor shown in FIG. 2A due to the action of the gravitational force applied to the shielding liquid 63. Thus, in accordance with the positional relationship between the photoelectric displacement sensing element 62 and the bubble 630, namely, a position on the photoelectric displacement sensing element 62 on which a light beam passing through the bubble 630 falls, a signal indicative of the turn angle of the steering wheel is generated.

The functions of the rotational angle sensors 6 and 7 and the sensor output processing circuit 54 will be described with reference to FIGS. 3(A) and 3(B).

Figure 3:
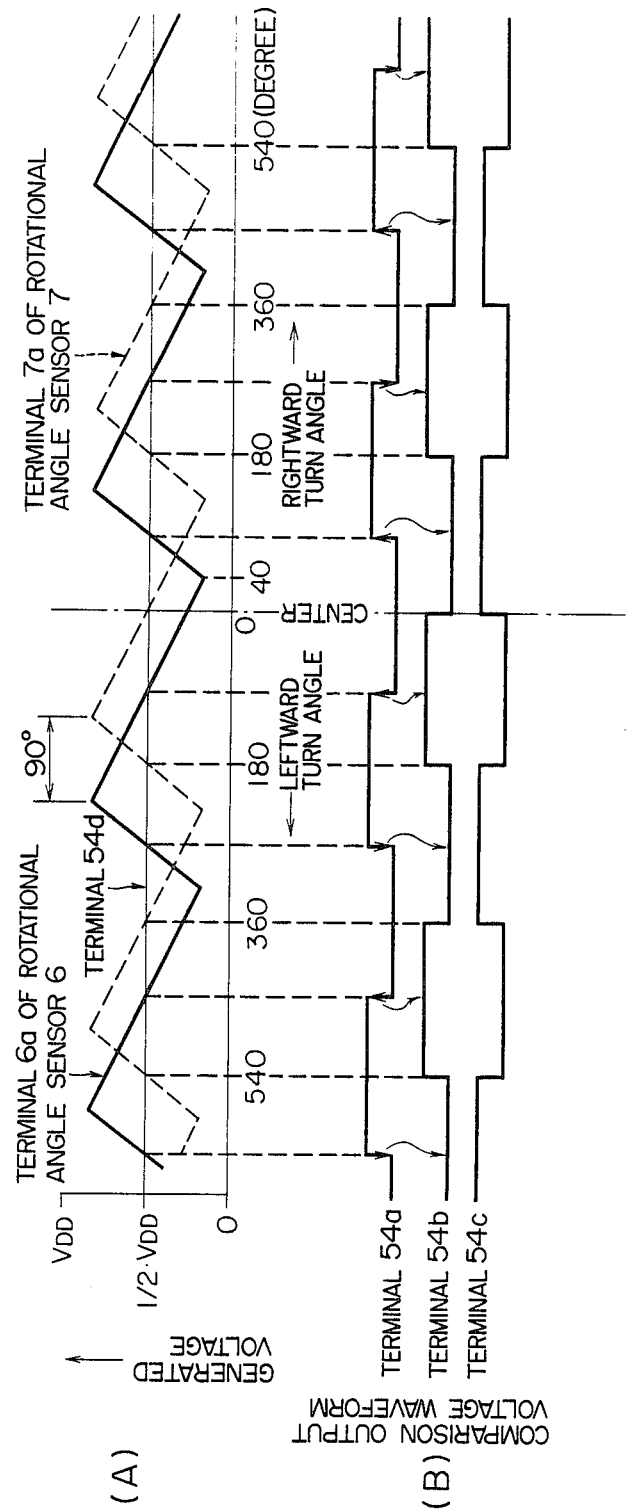
FIG. 3(A) is a waveform diagram showing the waveforms of voltages generated from the rotational angle sensors 6 and 7 of the system of this invention when the steering wheel is turned to the left and right directions, respectively, and the level of a reference voltage to be compared with the generated voltages.
FIG. 3(B) is a waveform diagram showing two comparison output voltage waveforms generated as a result of the comparison between the output voltages of the rotational angle sensors 6 and 7 shown in FIG. 3(A) and the reference voltage made by two comparators shown in FIG. 1 and an inverted voltage waveform of one of the comparison output voltage waveforms.

As will be seen from the output voltage waveforms of the rotational angle sensors 6 and 7 shown in FIG. 3(A), the mounting positions of the respective rotational angle sensors 6 and 7 on the steering wheel are shifted from each other by a given angle (by a relative shift angle of 90° in this embodiment). In addition, one of the sensors (the sensor 6 in this embodiment) is mounted on the steering wheel so that the 40-degree right turn position with respect to the center position of the steering wheel (which causes the vehicle to move straightly ahead and which is indicated by "center" in FIG. 3(A)) causes the voltage generated at a terminal 6a of the sensor 6 to become minimum. The voltages generated by the respective sensors 6 and 7 are compared with a reference voltage (the voltage at a terminal 54d or $\frac{1}{2}V_{DD}$ in this embodiment) by the comparators in the sensor signal processing circuit 54, and the voltage signals of the waveforms shown in FIG. 3(B) are produced at the respective output terminals 54a, 54b and 54c of the sensor output processing circuit 54.

It should be noted here that, when, for example, the steering wheel is turned to the right, the signal at the terminal 54b is at its low level when the signal at the terminal 54a rises to its high level and the signal at the terminal 54b is at its high level when the signal at the terminal 54a falls to its low level. When the steering wheel is turned to the left, the signal at the terminal 54b is at its high level when the signal at the terminal 54a rises to its high level and the signal at the terminal 54b is at its low level when the signal at the terminal 54a falls to its low level. Thus, in accordance with the differences in the relation of the direction of change of the signal at the terminal 54a with the level of the signal at the terminal 54b between the left and right turns of the steering wheel, it is possible to detect the direction of turn of the steering wheel.

Further, as will be seen from FIG. 3(A), by varying the reference voltage applied to the terminal 54d, it is possible to arbitrarily change the angles at which the direction of turn of the steering wheel is detected (at intervals of 90° in the left and right directions, respectively, as is seen from FIG. 3(B)).

Next, the method of deciding the turn directions and the turn angle of the steering wheel will be described with reference to FIGS. 4, 5 and 1.

Firstly, an explanation will be made of a case where the steering wheel is turned rightward, by referring to the signal waveform diagram of FIG. 4. The initial setting of the system of this invention is effected in such a way that the steering wheel having the system of this invention mounted thereon is put in the center position and the count of a known BCD up-down counter 552 (TC4510BP) is initially set to the decimal numeral 5 in the BCD form by a signal from the power-on pulse generating circuit 56 and the setting switch 59. Starting from this condition of initial setting, when the steering wheel is turned rightward by 90°, the signal at the output terminal 54a of the sensor signal processing circuit 54 in FIG. 1 changes from the low level to the high level. This signal actuates a one-shot circuit including a known monostable multivibrator 551 (TC4528), and the output signal at its output terminal 55c changes from the low level to the high level and remains there for a predetermined time period (4 msec in this embodiment). In response to this change, the signal at a terminal 55d changes from the high level to the low level, which actuates a known decade Johnson counter 553 (TC4017) to cause a one-shot signal to be generated at a terminal 55a. A known D-type flip-flop 554 (TC4013BP) generates a high-level signal at its output terminal 55f in response to this one-shot signal and in accordance with the high-level signal which is then present at a terminal 55e. The high-level signal at the output terminal 55f triggers a BCD up-down counter 552 to put it in the count-up state. At this time, the indicating power supply circuit 53 simultaneously operates to supply electric power to the lamp section 58.

Next, when the signal at the terminal 55c changes from the high level to the low level after the expiration of the predetermined time period, the signal at the terminal 55d changes from the low level to the high level, which triggers the BCD up-down counter 552 to cause the count value thereof to become "6" by adding "1" to the value initially set therein. As a result, the $Q_6$ output terminal of a known BCD-to-decimal decoder 555 (TC4028) rises to the high level, which then drives the lamp 583 in the lamp section 58 through a known transistor array 556 (TD62004), thereby giving an indication that the steering wheel has been turned rightward by 90°.

Further, when the steering wheel is turned rightward successively so that the turn angle exceeds 270°, the same operation as mentioned above is performed. As a result, the count value of the BCD up-down counter 552 becomes "7", and the lamp 584 is turned on.

Secondly, the operation which takes place when the steering wheel is turned leftward will be described with reference to the signal waveform diagram of FIG. 5.

Firstly, starting from the condition of initially setting of the BCD up-down counter 552 as mentioned hereinbefore, when the steering wheel is turned leftward by 90°, the signal at the output terminal 54a of the sensor signal processing circuit 54 in FIG. 1 changes from the low level to the high level. This high level signal actuates the one-shot circuit including the monostable multivibrator 551, and an output signal is produced at its output terminal 55c which rises to the high level to stay there for the predetermined time period. In response to this signal level change at the output terminal 55c, a signal is produced at the terminal 55d which falls to the low level for the predetermined time period. As a result of this level change of the signal at the terminal 55d, the decade Johnson counter 553 is put into operation and a one-shot signal is produced at the terminal 55a. In response to this one-shot signal and also in accordance with the low level state of the signal at the terminal 55e at this time, the D-type flip-flop 554 generates a low-level signal at its output terminal 55f. This low-level signal at the output terminal 55f triggers the BCD up-down counter 552 to put it in the countdown state. At this time, the indicating power supply circuit 53 is simultaneously operated by the one-shot signal to supply electric power to the lamp section 58.

Next, when the signal at the terminal 55a changes from its high level to its low level after the expiration of the predetermined time period, the signal at the terminal 55d changes from its low level to its high level so that the BCD up-down counter 552 is put into operation and the count value thereof decreases to "4" by substracting "1" from the value fo initial setting. As a result, the $Q_4$ output terminal of the BCD-to-decimal decoder 555 rises to the high level, which then drives the lamp 581 in the lamp section 58 through the transistor array 556, thereby indicating that the steering wheel has been turned leftward by 90°. Further, when the steering wheel is successively turned leftward so that the turn angle exceeds 270°, the same operation as mentioned above is performed, whereby the count value of the BCD up-down counter 552 becomes 3 and the lamp 582 is turned on. As mentioned previously, the lamps 582 and 584 emit a red light beam and the lamps 581 and 583 emit a yellow light beam, thereby giving an indication of the degrees of the danger which can be discriminated by the respective light beam colors.

While, in the above-described embodiment, the turn angle of the steering wheel is detected by the system incorporating the bubble portion 630 in the shielding liquid 63, the red LED 61 and the photoelectric displacement sensing element 62, it is apparent that the system may be replaced by a system wherein, as an example, a movable element of a magnetic material is detected by a magnetosensitive element including a Hall generator, a magnetresistance element, etc. or by any other detecting system so long as the system can be incorporated in the steering wheel and is capable of producing an electric signal corresponding to a turn angle of the steering wheel.

Further, while the above-described embodiment uses a turn angle range indicating system which utilizes the classification by the lamp color, any other indicating system including a numerical indicating system employing a liquid crystal indicator, a pointer-type analog meter, etc. may be used so long as it is capable of giving a warning indication in the form of an electric signal.

Still further, while, in the above-described embodiment, the turn angle signal is applied solely to the steering angle indicating system, if additional slip rings, etc. are provided, the turn angle signal may be used as a control signal for a suspension control system of a type which controls a damping force of the shock absorber of the vehicle in accordance with the steering angle.

As will be seen from the foregoing description, by virtue of the fact that the system of the present invention incorporates, within the steering wheel of a vehicle, a plurality of rotational angle sensors for generating electric signals indicative of the turn angle of the steering wheel, indicating means responsive to the turn angle signals from the rotational angle sensors to compute and indicate the turn direction and the turn angle of the steering wheel, and a power supply circuit which is supplied with electric power from the load side of a horn switch disposed in the steering wheel, it is possible to have remarkable effects such that the system can be easily mounted on the vehicle and that the indicating means can be arranged on the upper surface of the steering wheel which can be readily perceived from the driver's seat.

We claim:

1. A steering angle indicating system for a vehicle equipped with a steering wheel which has a horn switch, comprising:
   a plurality of rotational angle sensor means, each for generating a turn angle signal indicative of a turn angle of said steering wheel;
   indicating means, responsive to said turn angle signals from said rotational angle sensor means, for computing a turn direction and a turn angle of said steering wheel and indicating a result of the computation; and
   a power supply circuit and said indicator means supplied with electric power from a load side of said horn switch disposed in said steering wheel and including means for maintaining electric power for a predetermined time period after a stimulus; said stimulus including at least one of a time when said horn switch is actuated and a time when the power supply voltage on a load side of said horn switch decreases, said sensors, said indicating means and said power supply circuit being arranged within said steering wheel.

2. A system according to claim 1, wherein said maintaining means comprises a reverse current blocking diode connected to a load side of said horn switch and a capacitor connected to an output end of said diode.

3. A system according to claim 1, wherein said plurality of rotational angle sensor means are arranged to produce the turn angle signals as said steering wheel is turned and said turn angle signals are offset from each other by a predetermined angle.

4. A system according to claim 1, wherein said indicating means includes a plurality of indicating lamps, and said power supply circuit includes a power supply voltage drop detecting circuit, a voltage regulator circuit and indicating power supply means, having a timer circuit, for effecting lighting control of said indicating lamps so that one of said indicating lamps is lighted for a predetermined time period only when the value of the power supply voltage on the load side of said horn switch falls from a normal voltage value by more than a predetermined magnitude in less than a predetermined time and continues to remain in this fallen state for longer than a predetermined time period.

5. A system according to claim 1, wherein said indicating means includes a plurality of colored indicating lamps, and turn discriminating means responsive to said turn angle signals from said rotational angle sensor means, for computing the turn direction and turn angle of said steering wheel, and said power supply circuit includes indicating power supply means, including a timer circuit, for effecting lighting control of said colored indicating lamps so that, each time the turn angle signals from said rotational angle sensors change at predetermined angles, one of said colored indicating lamps is lighted for a predetermined time period, and when no predetermined turn angle change of said steering wheel occurs for a predetermined time period, all said colored indicating lamps are turned off, and for simultaneously effecting selective light color control of said colored indicating lamps in accordance with the turn angle of said steering wheel.

6. A steering angle indicating system for a vehicle equipped with a steering wheel which is capable of rotation about an axis of rotation and which includes a horn switch, comprising:
   a plurality of rotational angle sensor means, each comprising: (1) a light emitting element, (2) a ring-shaped photoelectric sensing element arranged circumferentially around said axis of rotation of said steering wheel, ring end portions of said photoelectric sensing element forming a predetermined circumferential angle with respect to a reference line passing through said axis of rotation and (3) means, provided between said light emitting element and said photoelectric sensing element, for forming a light transmitting path from said light emitting element to a portion of said photoelectric sensing element in accordance with a turn position of said steering wheel, whereby said plurality of rotational angle sensor means are for generating a turn angle signal indicative of a turn angle of said steering wheel;

indicating means, responsive to said turn angle signals from said rotational angle sensor means, for computing a turn direction and a turn angle of said steering wheel and indicating a result of the computation; and a power supply circuit supplied with electric power from a load side of said horn switch disposed in said steering wheel, said sensors, said indicating means and said power supply circuit being arranged within said steering wheel wherein said power supply circuit and said indicator means includes means for maintaining electric power for a predetermined time period after a stimulus, said stimulus including at least one of a time when said horn switch is actuated and a time when the power supply voltage on the load side of said horn switch decreases.

7. A system according to claim 6, wherein said light transmitting path forming means comprises a light transmitting member having a light intercepting liquid and an air bubble portion enclosed therein, said air bubble portion selectively forming a light transmitting path from said light emitting element to a portion of said photoelectric sensing element as said air bubble portion moves in said light intercepting liquid in accordance with a turn position of said steering wheel.

8. A system according to claim 6, wherein each of said rotational angle sensor means includes a housing unit, said light emitting element, said photoelectric sensing element and said light transmitting path forming means being enclosed within said housing unit.

9. A system according to claim 7, wherein each of said rotational angle sensor means includes a housing unit, said light emitting element, said photoelectric sensing element and said light transmitting path forming means being enclosed within said housing unit.

10. A system according to claim 6, wherein said plurality of rotational angle sensor means are arranged to produce the turn angle signals as said steering wheel is turned and said turn angle signals are offset from each other by a predetermined angle.

11. A system according to claim 6, wherein said indicating means includes a plurality of indicating lamps, and said power supply circuit includes a power supply voltage drop detecting circuit, a voltage regulator circuit and indicating power supply means having a timer circuit, for effecting lighting control of said indicating lamps so that one of said indicating lamps is lighted for a predetermined time period only when the value of the power supply voltage on the load side of said horn switch falls rapidly from a normal voltage value by more than a predetermined magnitude and continues to remain in this fallen state for longer than a predetermined time period.

12. A system according to claim 6, wherein said indicating means includes a plurality of colored indicating lamps, and turn discriminating means responsive to the turn angle signals from said rotational angle sensors, for computing the turn direction and turn angle of said steering wheel, and said power supply circuit includes indicating power supply means, including a timer circuit, for effecting light control of said colored indicating lamps so that, each time the turn angle signals from said rotational angle sensors change at predetermined angles, one of said colored indicating lamps is lighted for a predetermined time period, and when no predetermined turn angle change of said steering wheel occurs for a predetermined time period, all of said indicating lamps are turned off, and for simultaneously effecting selective light color control of said colored indicating lamps in accordance with the turn angle of said steering wheel.

* * * * *